Patented Jan. 1, 1924.

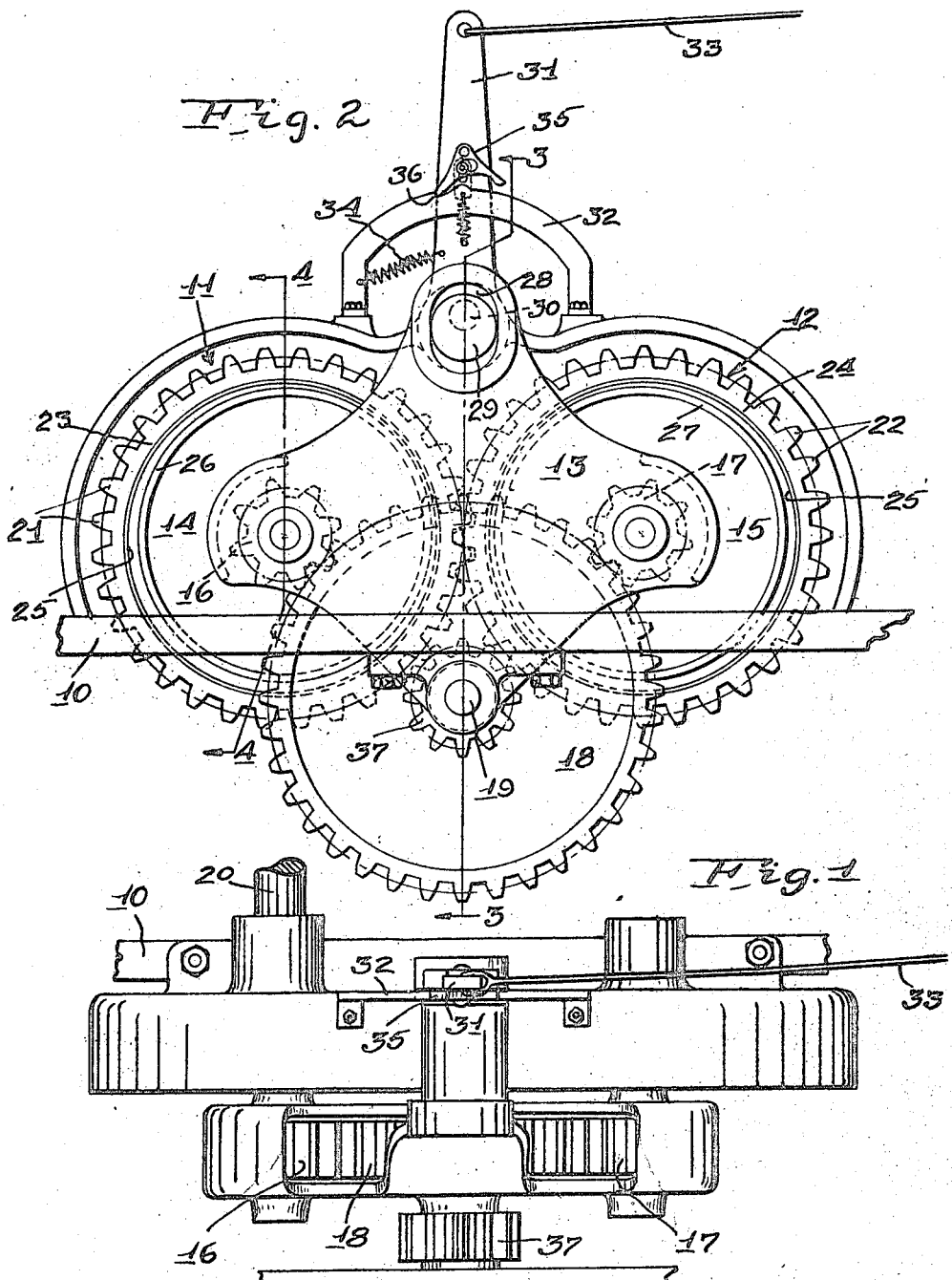

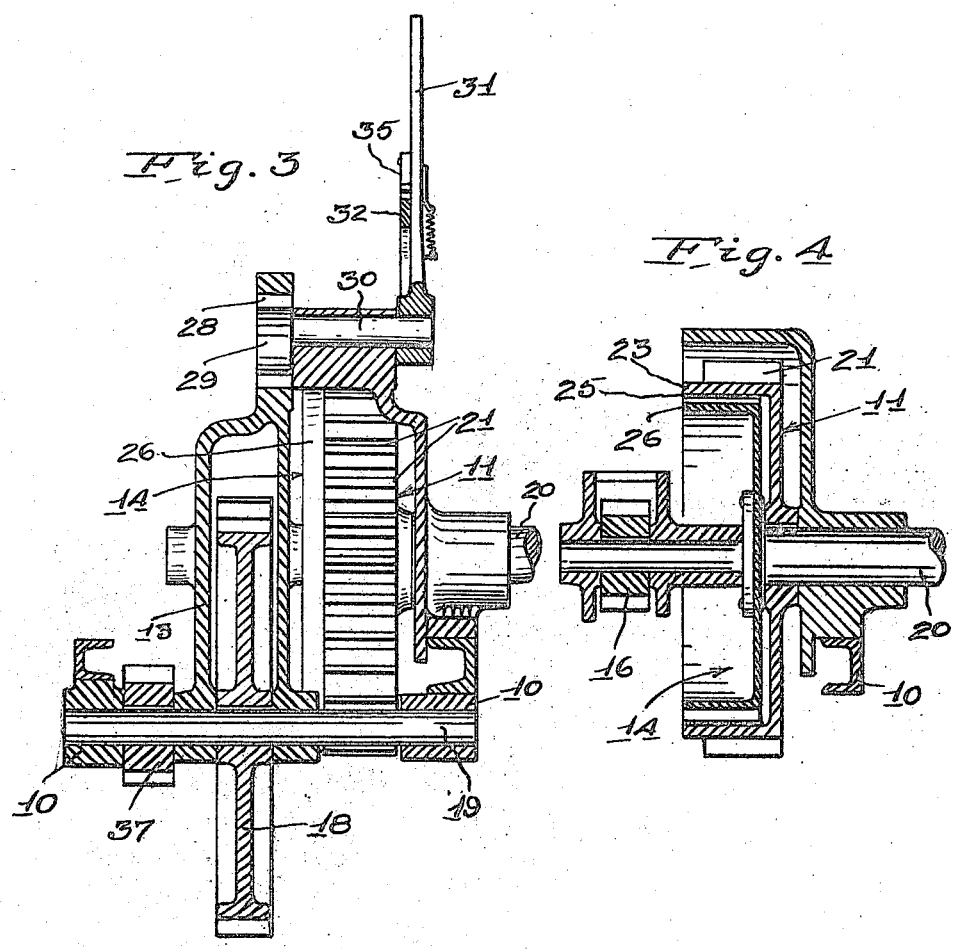

1,478,997

UNITED STATES PATENT OFFICE.

DAVID FRANKLIN GEIGER, OF LOS ANGELES, CALIFORNIA.

POWER TRANSMITTER AND OPERATING MECHANISM THEREFOR.

Application filed May 14, 1921, Serial No. 469,417. Renewed May 22, 1923.

*To all whom it may concern:*

Be it known that I, DAVID FRANKLIN GEIGER, a citizen of the United States, residing in Los Angeles, county of Los Angeles, State of California, have invented a new and useful Power Transmitter and Operating Mechanism Therefor, of which the following is a specification.

My invention relates to improvements in power transmitters.

Its object is to provide a simple, durable and efficient line or rein controlled device of this kind designed particularly, though not exclusively, for tractors having independent combination driving and steering wheels, said device being adapted to be provided in duplicate, one for each wheel of a tractor, whereby an operator may start, stop, turn and reverse the tractor through the medium of two lines, as in driving a team.

With the foregoing and other objects in view which will appear in the following description, the invention resides in the novel combination and arrangement of parts and in the details of costruction hereinafter described and claimed.

In the drawings, Fig. 1 is a plan view of a device embodying my invention; Fig. 2 is an elevation thereof; Fig. 3 is a sectional view taken on the line 3—3 of Fig. 2, and Fig. 4 is a sectional view taken on the line 4—4 of Fig. 2.

Referring to the drawings, it will be observed that my improved transmitter includes a frame 10, two driving wheels 11 and 12 journaled on said frame, a tiltable support 13, two driven wheels 14 and 15 journaled on said support and co-operating respectively with the driving wheels 11 and 12, a power take-off gear 16 on the driven wheel 14, a similar gear 17 on the driven wheel 15, a power take-off gear 18 meshing with both of the gears 16 and 17 and mounted upon a shaft 19, upon which the support 13 is tiltably carried. The driving wheel 11 is propelled by the power shaft 20 of an engine or other source of power, said wheel being supplied with external teeth 21 meshing with similar teeth 22 on the outer periphery of the driving wheel 12. Within the rims 23 and 24 of said driving wheels, I apply friction bands 25. The rim 26 of the driven wheel 14 normally clears the band 25 of the driving wheel 11 only slightly, as shown, the rim 27 of the driven wheel 15 being likewise related to the band 25 of the driving wheel 12.

The upper end of the tiltable support 13 is formed with a slot 28 to receive a cam 29 on a rock-shaft 30 journaled in the frame 10. An upright lever 31, fixed to said rock-shaft, swings in a plane adjacent to a quadrant 32 on the frame 10. A line 33 attached to said lever serves to tilt the support 13 in one direction through the rock-shaft 30 and cam 29, while a retracting spring 34, stretched between said lever 31 and a leg of the quadrant 32, operates to shift the support 13 in a reverse direction. A self-tripping dog 35 on the lever 31 engages a catch 36 in the quadrant 32 and holds the lever 31 in neutral, upright position against the action of the spring 34.

One use of the present device is, as above noted, in connection with ordinary tractors having independent combination traction and steering wheels. In such use, two of my transmitters are employed. a gear 37 on the shaft 19 of each transmitter being connected through suitable gearing with its respective traction wheel. With the lever 31 in neutral position, wherein the same is releasably held by the dog 35, the driven wheels 14 and 15 are held from engagement with their respective driving wheels 11 and 12. A slight pull upon the line 33 to trip the dog 35, followed by releasing the line, results in the engagement of the driven wheel 14 with the driving wheel 11, through the action of the spring 34 on the lever 31 and the consequent operation of the rock-shaft 30 and cam 29. A pull upon the line 33 sufficient to return the lever 31 to upright position, frees the driven wheel 14 from the driving wheel 11, while a continued pull upon said line results in engaging the driven wheel 15 with the driving wheel 12. The driving wheels 11 and 12, turning in opposite directions, reverse the movement of the driven train connected with the driven wheels 14 and 15. Thus it will be seen that a traction wheel or other driven element associated with a source of power through my improved transmitter may be propelled in opposite directions or stopped by the manipulation of the line 33. When applied to a tractor of the type above noted, the operator, through two flexible reins or lines, is able to start, stop, turn and reverse the tractor, as in driving a team.

Numerous structural features making for simplicity, durability and efficiency will be noted. End thrusts have been eliminated. The frictional contacting area between the driving and driven wheels is great, whereby slippage and consequent wear is materially reduced. The replaceable friction bands 25, being carried by the driven wheels, wear uniformly. The relation of driving and driven wheels 11, 12 and 14, 15 is such that upon engagement of a driven wheel with its respective driving wheel, the former is caused to increase its grip upon the latter under increasing stresses. In other words, the heavier the load upon the driven member, the greater the frictional grip between said member and its companion driving member.

Changes in the specific form of my invention, as herein disclosed, may be made within the scope of what is claimed without departing from the spirit of my invention.

Having described my invention, what I claim as new and desire to secure by Letters Patent is:

1. In a device of the class described, a pair of intermeshing wheels, a second pair of wheels including a companion wheel for each intermeshing wheel, an internal friction surface on each wheel of one pair, an external friction surface on each wheel of the other pair, a tiltable support upon which said second pair of wheels is journaled, means for tilting said support to severally engage the friction surfaces of second pair of wheels with the friction surfaces of the other pair, power connections associated with said pairs of wheels, said support tilting means including a cam and a lever associated therewith, together with a line and a retracting device operating upon said lever to shift the same in opposite directions.

2. In a device of the class described, a pair of intermeshing wheels, a second pair of wheels including a companion wheel for each intermeshing wheel, an internal friction surface on each wheel of one pair, an external friction surface on each wheel of the other pair, a tiltable support upon which said second pair of wheels is journaled, means for tilting said support to severally engage the friction surfaces of said second pair of wheels with the friction surfaces of the other pair and power connections associated with said pairs of wheels.

3. In a device of the class described, a pair of intermeshing driving wheels, a tiltable support, a pair of driven wheels on said support including one wheel for each of said driving wheels, an internal friction surface on each driving wheel, an external friction surface on each driven wheel, said surfaces being substantially equal in diameter, a spur gear carried by each driven wheel, a take-off gear meshing with both of said spur gears, a cam for tilting said support to severally engage said driven wheels with said driving wheels, a lever for actuating the cam, a line attached to the lever for tilting the same in one direction and a yielding retracting device operating upon said lever in the opposite direction.

4. In a device of the class described, a pair of intermeshing driving wheels, a tiltable support, a pair of driven wheels on said support including one wheel for each of said driving wheels, an internal friction surface comprising a replaceable band on each driving wheel, an external friction surface on each driven wheel, said surfaces being substantially equal in diameter, a spur gear carried by each driven wheel, a take-off gear meshing with both of said spur gears, and a lever for tilting said support to severally engage said driven wheels with said driving wheels.

5. In a device of the class described, a pair of intermeshing driving wheels, a tiltable support, a pair of driven wheels on said support including one wheel for each of said driving wheels, an internal friction surface on each driving wheel, an external friction surface on each driven wheel, said surfaces being substantially equal in diameter, a spur gear carried by each driven wheel, a take-off gear meshing with both of said spur gears, and a lever for tilting said support to severally engage said driven wheels with said driving wheels.

6. In a device of the class described, a pair of intermeshing wheels, a second pair of wheels including a companion wheel for each intermeshing wheel, an internal friction surface on each wheel of one pair, an external friction surface on each wheel of the other pair, one pair of wheels being movable to severally engage the friction surfaces thereof with the friction surfaces of the other pair, power connections associated with said pairs of wheels, means for shifting the movable wheels including a lever, a line attached to the lever for swinging the same in one direction and thereby engaging the friction surface of one of the movable wheels with its companion friction surface on one of the intermeshed wheels, and retracting means to swing said lever in the opposite direction to affect a neutral relation of said wheels and further to engage the friction surface of the other movable wheel with its companion friction surface on the other intermeshing wheel.

7. In a device of the class described, a pair of intermeshing wheels, a second pair of wheels including a companion wheel for each intermeshing wheel, an internal friction surface on each wheel of one pair, an external friction surface on each wheel of the other pair, one pair of wheels being movable to severally engage the friction surfaces thereof with the friction surfaces of the other pair, power connections associated with said pairs of wheels, means for shifting the movable wheels including a lever, a line attached to the lever for swinging the same in one direction, retracting means to swing said lever in the opposite direction and a self-tripping latch to hold said lever in neutral position wherein the friction surfaces of said wheels are disengaged.

8. In a device of the class described, a pair of intermeshing wheels, a second pair of wheels including a companion wheel for each intermeshing wheel, an internal friction surface on each wheel of one pair, an external friction surface on each wheel of the other pair, one pair of wheels being movable to severally engage the friction surfaces thereof with the friction surfaces of the other pair and power connections associated with said pairs of wheels, said wheels being arranged in such relation that the grip between the operative movable wheel and its companion driving wheel is increased under increasing loads upon the former.

9. In a device of the class described, a pair of intermeshing wheels, a second pair of wheels including a companion wheel for each intermeshing wheel, an internal friction surface on each wheel of one pair, an external friction surface on each wheel of the other pair, one pair of wheels being movable to severally engage the friction surfaces thereof with the friction surfaces of the other pair and power connections associated with said pairs of wheels.

In testimony whereof, I have signed my name to this specification.

DAVID FRANKLIN GEIGER.